United States Patent
Hariharan et al.

(10) Patent No.: US 11,665,473 B2
(45) Date of Patent: May 30, 2023

(54) TRANSMITTING MICROPHONE AUDIO FROM TWO OR MORE AUDIO OUTPUT DEVICES TO A SOURCE DEVICE

(71) Applicant: Apple Inc., Cupertino, CA (US)

(72) Inventors: Sriram Hariharan, San Jose, CA (US); Alon Paycher, Beit Hananya (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/448,758

(22) Filed: Sep. 24, 2021

(65) Prior Publication Data

US 2023/0096843 A1 Mar. 30, 2023

(51) Int. Cl.
*H04R 3/00* (2006.01)
*H04W 76/10* (2018.01)
*H04R 1/10* (2006.01)
*H04W 28/06* (2009.01)
*H04W 4/80* (2018.01)

(52) U.S. Cl.
CPC ............. *H04R 3/00* (2013.01); *H04R 1/1016* (2013.01); *H04W 28/065* (2013.01); *H04W 76/10* (2018.02); *H04R 2420/07* (2013.01); *H04W 4/80* (2018.02)

(58) Field of Classification Search
CPC .... H04R 3/00; H04R 1/1016; H04R 2420/07; H04W 76/10; H04W 28/065; H04W 4/80
See application file for complete search history.

(56) References Cited

U.S. PATENT DOCUMENTS

| | | |
|---|---|---|
| 10,944,154 B1 | 3/2021 | Tong et al. |
| 10,966,047 B1 * | 3/2021 | Tong ...................... H04R 5/033 |
| 2014/0093093 A1 | 4/2014 | Dusan et al. |
| 2018/0270565 A1 | 9/2018 | Ganeshkumar |
| 2018/0336901 A1 | 11/2018 | Masaki et al. |
| 2019/0104423 A1 | 4/2019 | Hariharan et al. |
| 2019/0247010 A1 | 8/2019 | Barnacka |

OTHER PUBLICATIONS

Bluetooth Sig Board of Directors et al., "Bluetooth Core Specification v5.2: vol. 2, part B, ch. 6", Dec. 31, 2019, pp. 467-487.

* cited by examiner

*Primary Examiner* — Andrew L Sniezek
(74) *Attorney, Agent, or Firm* — Fay Kaplun & Marcin, LLP (57) ABSTRACT

The exemplary embodiments relate to implementing techniques for transmission of audio data from both of a pair of audio output devices to a user equipment (UE). A first wireless audio output device establishes a communication link to a source device using a wireless communication protocol, receives source audio data from the source device, receives secondary audio data from a second wireless audio output device and combines primary audio data from the first wireless audio output device with the secondary audio data into a consolidated audio packet. The consolidated packet is then transmitted to the source device.

20 Claims, 5 Drawing Sheets

TRANSMITTING MICROPHONE AUDIO FROM TWO OR MORE AUDIO OUTPUT DEVICES TO A SOURCE DEVICE

BACKGROUND

A user equipment (UE) may provide audio data to one or more audio output devices using a short-range communication protocol. For example, a user may have the UE and a pair of wireless audio buds. The UE may communicate with the wireless audio buds using a short-range communication protocol, such as Bluetooth. Once connected, the user may listen to music, a call or any other type of audio with the wireless audio buds.

SUMMARY

Some exemplary embodiments are related to a processor of a first wireless audio output device. The processor establishes a communication link to a source device using a wireless communication protocol, receives source audio data from the source device, receives secondary audio data from a second wireless audio output device and combines primary audio data from the first wireless audio output device with the secondary audio data into a consolidated audio packet. The consolidated packet is then transmitted to the source device.

Other exemplary embodiments are related to a first wireless audio output device comprising a transceiver configured to communicate with a source device and a processor communicatively coupled to the transceiver and configured to perform operations. The first wireless audio output device establishes a communication link to a source device using a wireless communication protocol, receives source audio data from the source device, receives secondary audio data from a second wireless audio output device and combines primary audio data from the first wireless audio output device with the secondary audio data into a consolidated audio packet. The consolidated packet is then transmitted to the source device.

Further exemplary embodiments are related to a method performed by a first wireless audio output device. The first wireless audio output device receives source audio data in a first slot of a first transmission interval from a source device and transmits a consolidated audio packet to the source device. The consolidated audio packet comprising primary audio data generated by the first wireless audio output device and secondary audio data generated by a second wireless audio output device in a second slot of the second transmission interval.

DETAILED DESCRIPTION

The exemplary (or example) embodiments may be further understood with reference to the following description and the related appended drawings, wherein like elements are provided with the same reference numerals. The exemplary embodiments relate to implementing techniques for transmission of audio data from both of a pair of audio output devices to a user equipment (UE).

The exemplary embodiments are described with regard to the UE providing audio data to one or more wireless audio output devices. Throughout this description, the terms "UE" and "source device" may be used interchangeably. However, any reference to a UE or a source device is merely provided for illustrative purposes. The exemplary embodiments may be utilized with any electronic component equipped with hardware, software, and/or firmware configured to communicate with wireless audio output devices using a short-range communication protocol.

The UE may communicate with one or more wireless audio output devices. The term "wireless audio output device" generally refers to an electronic device that is configured to wirelessly receive audio data and generate audio output. Various examples described herein may reference wireless audio buds (e.g., ear buds, wireless headphones, etc.), which is a specific type of wireless audio output device. Throughout this description, any reference to wireless audio output devices or wireless audio buds is merely provided for illustrative purposes. The exemplary embodiments may be utilized with any electronic component equipped with hardware, software and/or firmware configured to communicate with a source device via a wireless communication protocol and generate audio output, e.g., wireless speakers.

The exemplary embodiments are also described with regard to a short-range communication protocol that enables short-range communication between two or more devices. Various examples described herein may reference Bluetooth (e.g., Bluetooth, Bluetooth Low-Energy (BLE), etc.), which is a specific type of short-range communication protocol. However, the exemplary embodiments may be implemented using any type of wireless communication protocol or personal area network (PAN), e.g., WiFi Direct, etc. Throughout this description, any reference to the terms such as, "Bluetooth," "short-range communication protocol," "short-range connection," or "short-range communication link" is merely provided for illustrative purposes. The exemplary embodiments may apply to any appropriate type of communication protocol.

In addition, the exemplary techniques will be described with regard to an example scenario that includes a pair of wireless audio buds that includes a primary bud and a secondary bud. Presently, audio data may be transmitted from the source device (e.g., the UE) to both audio buds. However, microphone audio data is transmitted only from one of the audio buds (e.g., the primary bud).

The exemplary embodiments are configured to transmit microphone audio data from both wireless audio buds to the source device (e.g., the UE). As a result, improved noise cancelling of the microphone audio is realized. As will be described in more detail below, the exemplary embodiments include the secondary bud sending its microphone audio data to the primary bud, which transmits both the primary and secondary microphone audio data to the source device.

In another aspect, the exemplary embodiments may include one or both wireless audio buds providing the source device voice accelerometer data in addition to the microphone audio data. The voice accelerometer may collect physiological data such as vocal cord movement, breathing, coughing, sneezing, etc. The source device may utilize this voice accelerometer data in a variety of different applications such as, for example, health-related applications, noise filtering, etc.

Figure 1:
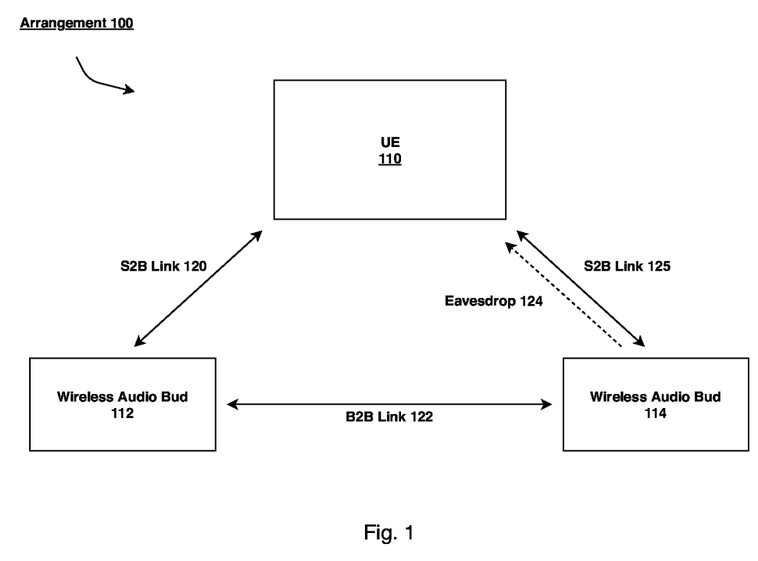
FIG. 1 shows an example arrangement of a user equipment (UE) and wireless audio buds according to various exemplary embodiments.

FIG. 1 shows an example arrangement 100 of UE 110 and wireless audio buds 112, 114 according to various exemplary embodiments. The exemplary arrangement 100 includes a UE 110. Those skilled in the art will understand that the UE 110 may represent any type of electronic component that is capable of communicating with one or more wireless audio output devices. Specific examples of the UE 110 include, but are not limited to, mobile phones, tablet computers, desktop computers, smartphones, embedded devices, wearables, Internet of Things (IoT) devices, video game consoles, media players, entertainment devices, smart speakers, smart TVs, streaming devices, etc. As mentioned above, the terms "UE" and "source device" may be used interchangeably throughout this description.

The UE 110 may communicate with a pair of wireless audio buds 112, 114 (e.g., ear buds, wireless headphones, etc.). However, any reference to wireless audio buds is merely provided for illustrative purposes. The exemplary embodiments may apply to scenarios that include any appropriate type of audio output device, including one or more wireless speakers and devices with one or more integrated speakers.

The example arrangement 100 also illustrates various types of communication links and/or interactions that may occur when using the short-range communication protocol. In some embodiments, a network of these connections may represent a PAN.

The arrangement 100 shows a source-to-audio bud (S2B) link 120 between the UE 110 and the wireless audio bud 112 (primary bud). In addition, an audio bud-to-audio bud (B2B) link 122 is shown between the wireless audio bud 112 and the wireless audio bud 114 (secondary bud). In this example, the communication links 120, 122 may be Bluetooth connections or any other appropriate type of connection. Therefore, the UE 110 and the wireless audio buds 112, 114 may be equipped with an appropriate chipset to communicate using a short-range communication protocol.

In some embodiments, the wireless audio bud 114 may be enabled to eavesdrop 124 (or snoop) on data being exchanged on the S2B link 120. In some embodiments, the wireless audio bud 114 may establish a S2B link 125 with the UE 110. This additional S2B link 125 may be used instead of or in addition to the eavesdrop 124 and the B2B link 122.

Communication links (e.g., S2B 120, S2B 125, B2B 122) may be established using a manual approach, an automated approach or a combination thereof. The manual approach refers to a process in which user input at one or more of the devices triggers the initiation of a connection establishment procedure. The automated approach refers to a mechanism in which connection establishment is initiated without a user-supplied command, e.g., using sensor data, proximity detection, an automated trigger, and/or other operations.

The arrangement 100 illustrates a possible network of short-range connections among the UE 110 and the wireless audio buds 112, 114. In some embodiments, the UE 110 and the audio bud 112 have a primary/secondary relationship over the S2B link 120 where the UE 110 is in control and/or has priority over the audio bud 112. Similarly, the UE 110 and the audio bud 114 may also have a primary/secondary relationship over the S2B link 125 where the UE 110 is in control and/or has priority over the audio bud 114.

In addition, the audio bud 112 and the audio bud 114 may have a primary/secondary relationship over the B2B link 122 where the audio bud 112 is in control and/or has priority over the audio bud 114. In other embodiments, devices connected via a short-range communication protocol (e.g., S2B link 120, S2B link 125, B2B link 122) may have a mutual relationship where the devices share or negotiate certain responsibilities.

A primary/secondary relationship between audio buds may be dynamic. For example, at a first time, the audio bud 112 may be set as the primary bud and the audio bud 114 may be set as the secondary bud. Subsequently, a predetermined condition may trigger the audio bud 114 to be set as the primary bud. Thus, at a second time, the audio bud 114 may be set as the primary bud and the audio bud 112 may be set as the secondary bud. During a session (e.g., streaming, a call, etc.), the pair of audio buds 112, 114 may switch roles any number of times. However, for purposes of the following description, the wireless audio bud 112 will be referred to as the primary bud and the wireless audio bud 114 will be referred to as the secondary bud.

Figure 2:
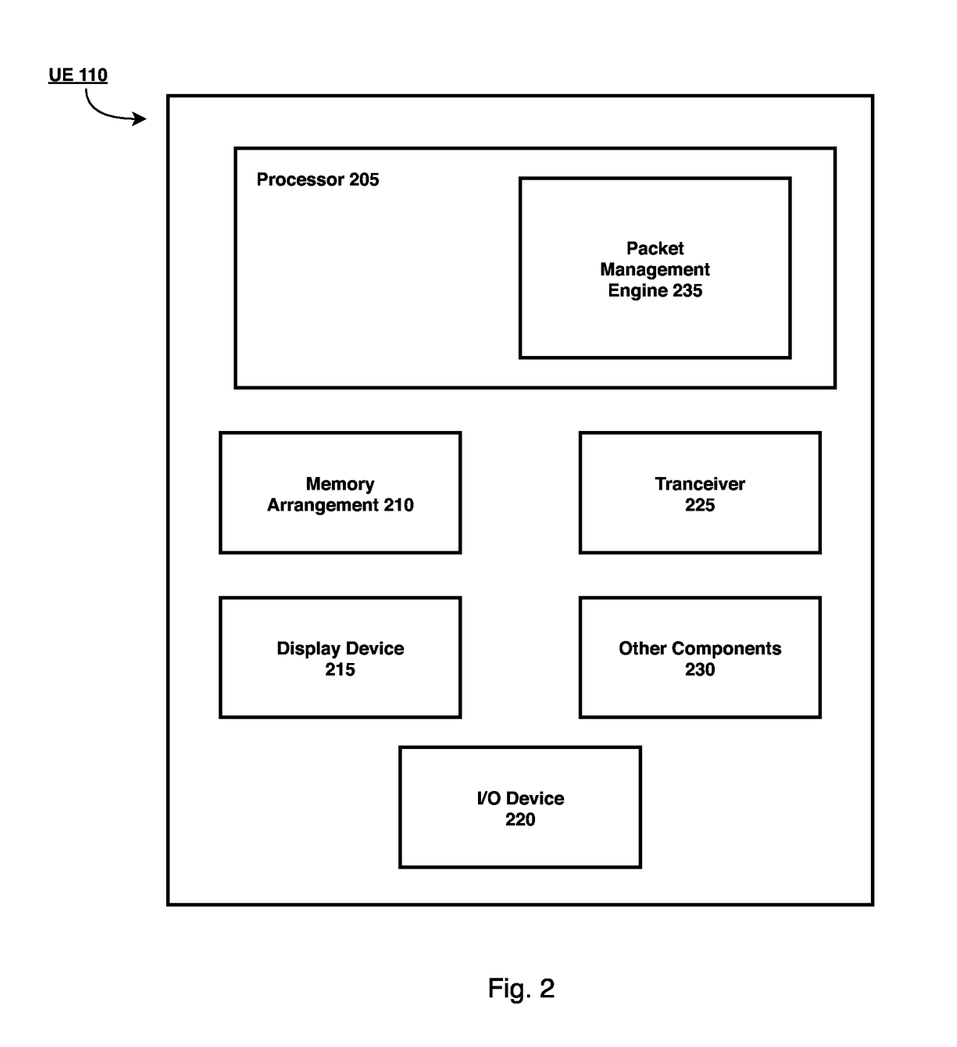
FIG. 2 shows an example UE according to various exemplary embodiments.

FIG. 2 shows an example UE 110 according to various exemplary embodiments. The UE 110 will be described with regard to the arrangement 100 of FIG. 2. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a packet management engine 235. The packet management engine 235 may be configured to perform operations related to processing microphone audio packets from both wireless audio buds 112, 114 and voice accelerometer data, as will be described in greater detail below.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen.

The transceiver 225 may represent one or more hardware components configured to perform operations related to wireless communication. For example, the transceiver 225 may represent one or more radios configured to communicate with a cellular network, a PAN, a wireless local area network (WLAN), etc. As indicates above, the exemplary embodiments may include the UE 110 communicating with a first audio output device over a first frequency band and a second audio output device over a second different frequency band. Accordingly, the transceiver 225 may operate on a variety of different frequencies or channels (e.g., set of consecutive frequencies).

Figure 3:
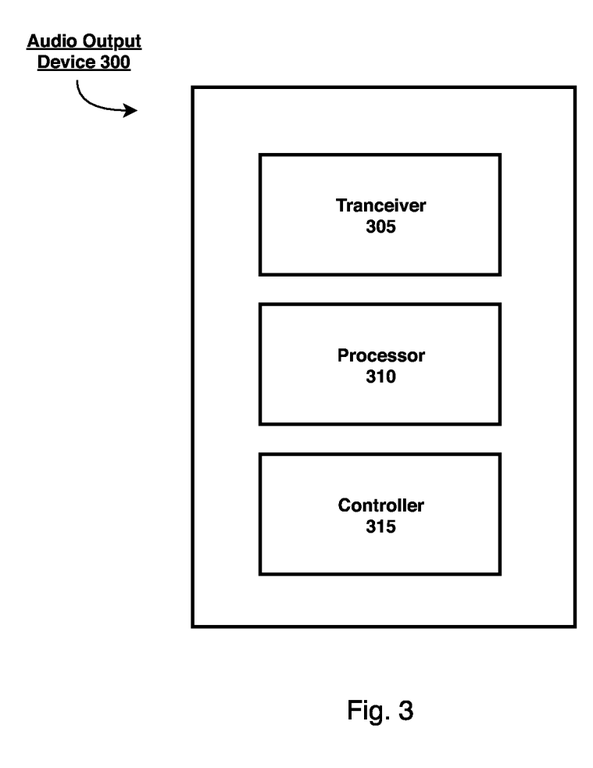
FIG. 3 shows an example audio output device according to various exemplary embodiments.

FIG. 3 shows an example audio output device 300 according to various exemplary embodiments. The audio output device 300 may represent either or both of the audio buds 112, 114 shown in the arrangement 100.

The device 300 may include a transceiver 305, a processor 310 and a controller 315. In addition, the device 300 may include other components (not shown) such as, but not limited to, a microphone, a memory, a battery and ports to electrically connect the device 300 to other electronic devices.

The transceiver 305 may represent one or more hardware components configured to perform operations related to wireless communication. For example, the transceiver 305 may represent one or more radios configured to communicate with a PAN or any other appropriate type of network. The transceiver 305 may enable a short-range connection to be established using frequencies or channels associated with the short-range connection (e.g., Bluetooth). In some embodiments, these frequencies may include the 2.4 GHz and 5 GHz bands. Accordingly, the transceiver 305 may operate on a variety of different frequencies or channels (e.g., set of consecutive frequencies).

The processor 310 may be configured to execute a plurality of engines for the audio output device 300. For example, the processor 310 may perform operations related to receiving connection information from a source device and joining an existing audio session. In some embodiments, the processor 310 may be represented as a separate incorporated component of the audio output device 300 or may be a modular component coupled to the audio output device 300, e.g., an integrated circuit with or without firmware. For example, the processor 310 may be a chip or integrated circuit compatible with the short-range communication protocol that includes input circuitry to receive signals and processing circuitry to process the signals and other information. The engines may also be embodied as one application or separate applications. In some embodiments, the functionality described for the processor 310 is split among two or more processors such as a baseband processor and an applications processor. In other embodiments, the transceiver 305 may also be configured to execute engines and/or operations for the audio output device 300.

The controller 315 may be configured to control the communication functions of the transceiver 305 and/or the processor 310. In addition, the controller 315 may also control non-communication functions related to the other components such as the memory, the battery, etc. Accordingly, the controller 315 may perform operations associated with an applications processor. The exemplary embodiments may be implemented in any of these or other configurations of an audio output device.

Figure 4:
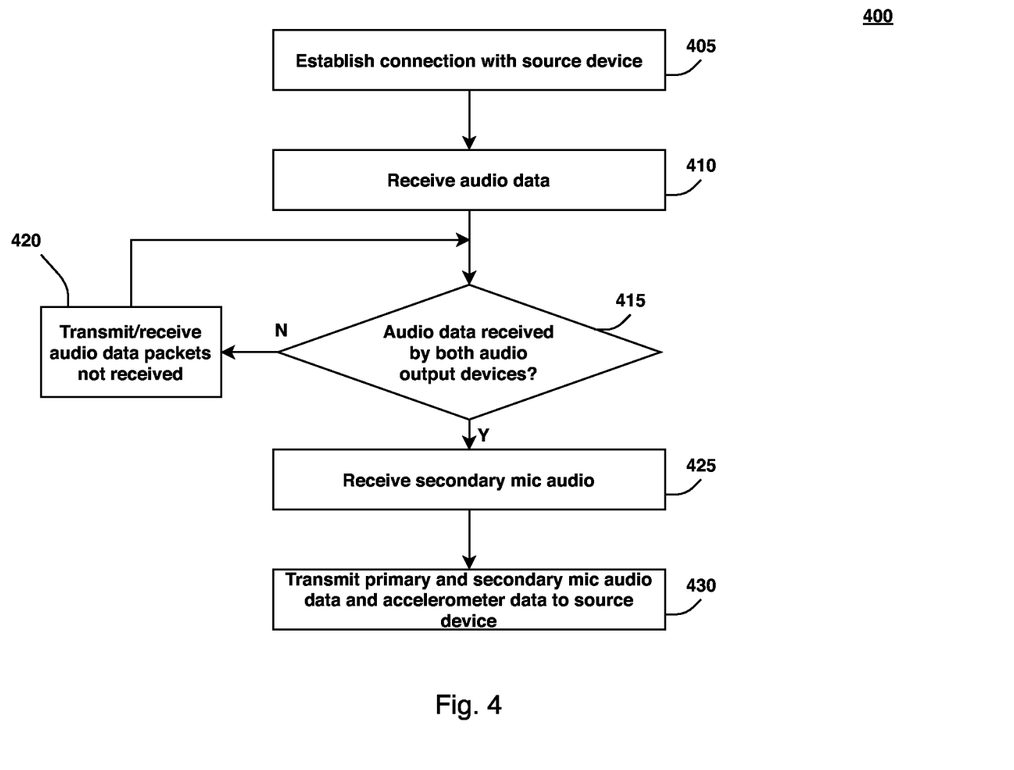
FIG. 4 shows an example method of transmitting primary and secondary microphone audio data to a source device according to various exemplary embodiments.

FIG. 4 shows an example method 400 of transmitting primary and secondary microphone audio data to a source device (e.g., UE 110) according to various exemplary embodiments. Throughout the description of the method 400 there may be references to a primary bud and a secondary bud. However, as indicated above, the exemplary embodiments are not limited to one of the wireless audio buds 112, 114 being a primary bud and the other being a secondary bud.

At 405, a short-range connection is established between a source device (e.g., UE 110) and a first audio output device (e.g., wireless audio bud 112). The short-range connection may be established using either a manual approach or an automated approach. In some embodiments, the audio bud 112 may provide connection information directly to the audio bud 114. This connection information may facilitate the establishment of the B2B link 122, the eavesdrop 124 and/or the S2B link 125.

At 410, the source device provides audio data to the first and second wireless audio output devices (wireless audio buds 112, 114). The primary bud (e.g., wireless audio bud 112) receives the audio data from the source device over the S2B link 120. The secondary bud (e.g., wireless audio bud 1142) may receive the audio data via the eavesdrop link 124. The audio data may be any type of payload data that may provide the basis for generating audio output. To provide some examples, the audio data may be part of a voice call or a data call.

At 415, the wireless audio output device determines whether both audio output devices received the audio packets from the source device. If one of the audio output devices (e.g., wireless audio bud 114) did not receive the audio packets from the source device successfully, then, at 420, the other one of the audio output devices (e.g., wireless audio bud 112) may transmit the lost audio packet to the device that did not receive it successfully. This lost packet transmission may occur over the B2B link 122. In other embodiments, the source device may retransmit the audio packet(s) that were not received successfully by both audio output devices.

If, however, the audio data from the source device is successfully received by both audio output devices, then, at 425, the primary bud (e.g., wireless audio bud 112) receives microphone audio data from the secondary bud (e.g., wireless audio bud 114). The secondary bud may transmit its microphone audio data to the primary bud over the B2B link 122. This B2B link 122 is the same link referenced above for the lost packets. Thus, the same B2B link may be used to deliver the lost packets and the microphone audio data.

At 430, the primary bud (e.g., wireless audio bud 112) transmits its microphone audio data and the secondary microphone audio data received from the secondary bud to the source device. In some embodiments, the primary bud may also transmit data from a voice accelerometer to the source device. In some embodiments, the voice accelerometer data is from the primary bud's accelerometer. In some embodiments, the voice accelerometer data is alternatively from the secondary bud's accelerometer and is sent to the primary bud along with the secondary bud's microphone audio data at 425. In some embodiments, the source device may use the accelerometer data to monitor and/or process user health-related parameters. Although not shown in the method 400, the operations 410-430 may be performed for each audio data packet or for a set of one or more audio data packets provided by the source device.

Figure 5:
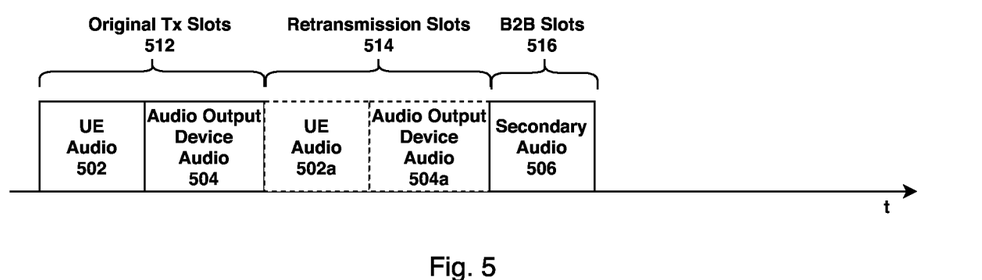
FIG. 5 shows a diagram illustrating an example of an extended synchronous connection oriented (eSCO) data traffic between a UE and an audio output device according to various exemplary embodiments.

FIG. 5 shows a diagram illustrating an example of an extended synchronous connection oriented (eSCO) data traffic between a UE 110 and an audio output device (e.g., wireless ear buds 112, 114) according to various exemplary embodiments. The UE 110 transmits audio data packets to the audio output device(s) in UE audio slot 502. If the UE transmission fails, the UE 110 may retransmit the audio data in the UE audio retransmission slot 502*a*. The primary bud (e.g., wireless ear bud 112) transmits microphone audio data packets (both the primary and secondary microphone audio data) as well as any voice accelerometer data packets in the audio output device audio data slot 504. If the audio output device audio data transmission fails, then the output device may retransmit the audio data in the audio output device audio retransmission slot 504*a*.

In addition to the original transmission slots 512 and the retransmission slots 514, the eSCO data traffic includes B2B slots 516 in which the secondary bud (e.g., wireless ear bud 114) transmits its microphone audio data 506 to the primary bud. The B2B slots may also be referred to as peer-to-peer slots. Typically, the B2B slots 516 are used when one audio output device needs to transmit source audio to the other audio output device that did not successfully receive the source audio. However, because this happens rarely, the secondary microphone audio can be transmitted in the B2B slots 516 to advantageously save bandwidth. When one of the audio output devices does need to transmit the source audio to the other audio output device that did not successfully receive the source audio, this source audio transmission can occur over the B2B slots 516 instead of the transmission of the secondary microphone audio. In such a scenario, the secondary bud may continue to transmit the secondary microphone audio data in the next instance of the B2B slots (the next interval).

In some embodiments, there may be multiple retransmission slots. For example, there may be one or more UE audio retransmission slots and/or one or more audio output device audio retransmission slots. In this type of scenario, the B2B slots 516 may occur after both audio output devices successfully received the packets from the UE 110 (e.g., the source device). Thus, reference to a single UE audio retransmission slot 502*a* and a single audio output device audio retransmission slot 504*a* is provided as an example and the exemplary embodiments may apply to any appropriate number of retransmissions slots.

Figure 6:
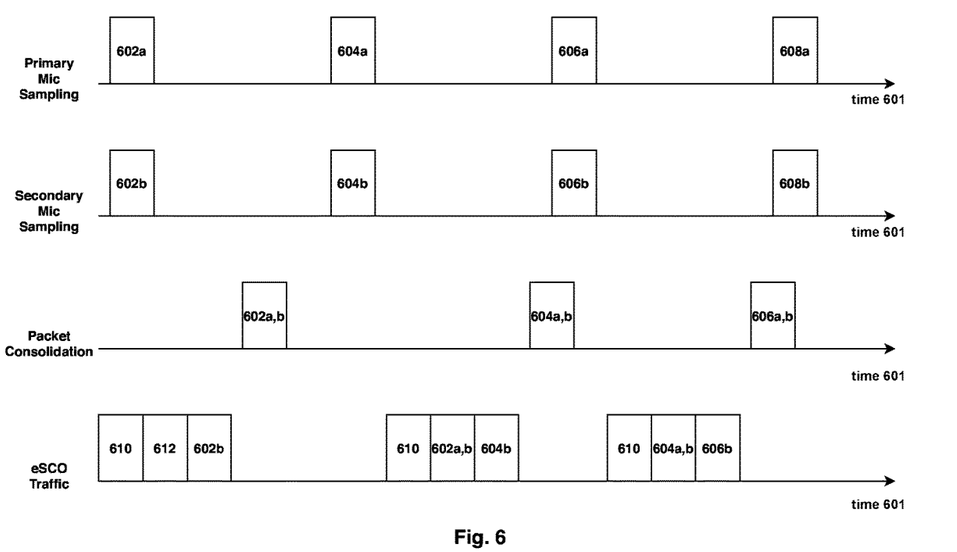
FIG. 6 shows a diagram illustrating an example method of composing consolidated data packets for eSCO transmissions according to various exemplary embodiments.

FIG. 6 shows a diagram illustrating an example method of composing consolidated data packets for eSCO transmissions according to various exemplary embodiments. FIG. 6 shows primary mic sampling, secondary mic sampling, packet consolidation and eSCO traffic on the same time axis 601.

As illustrated in FIG. 6, the primary microphone (e.g., wireless ear bud 112 microphone) is sampled at 602*a*, 604*a*, 606*a*, and 608*a* and the secondary microphone (e.g., wireless ear bud 114 microphone) is sampled at 602*b*, 604*b*, 606*b*, and 608*b*. In some embodiments, like in the example shown in FIG. 6, the sampling of the primary and secondary microphones is synchronized based on eSCO timing. Thus, the timing of the sampling corresponds to the duration between the eSCO traffic. However, there is no requirement that the sampling be synchronized and/or correlate to the eSCO traffic. In an actual operating scenario, the timing of the operations and traffic shown FIG. 6 may occur with any appropriate timing.

In this example, the first interval of eSCO traffic includes source device audio packets 610, output device audio packets 612, and secondary bud audio packets 602*b*. While the plural "packets" is being used in this example, it is possible that a singular "packet" is included for one or more of the transmissions in the interval. As explained above, the source device audio packets 610 may be transmitted by the source device over the S2B link 120 to the primary bud (e.g., wireless ear bud 112) in the UE audio slot of the first interval. In some embodiments, the output device audio packets 612 in the audio output device audio data slot of the first interval of eSCO traffic may not include any payload data. For example, the primary bud may wait to receive the secondary bud audio packets 602*b* before sending the output device audio packets to the source device in a subsequent interval.

As noted above, the secondary bud audio packets 602*b* are transmitted to the primary bud in the B2B slots of an eSCO transmission interval. After receiving the secondary bud audio packets 602*b*, the primary bud performs a packet consolidation for the primary and secondary bud audio packets 602*a,b*. In the second eSCO interval, the source audio packets are again sent from the source device to the primary bud. In this interval, however, the primary bud transmits the consolidated packet having the primary and secondary audio data (microphone audio) to the source device. The second interval also includes the secondary bud's subsequent audio packets 604*b* in the B2B slots of the eSCO interval.

Figure 7:
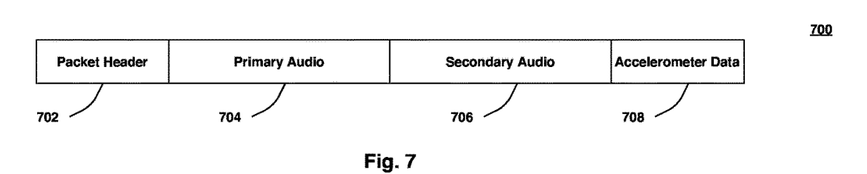
FIG. 7 shows an example of consolidated audio packet according to various exemplary embodiments.

An example of a consolidated audio packet 700 is illustrated in FIG. 7. The consolidated audio packet may include a packet header 702, the primary audio data 704, the secondary audio data 706, and voice accelerometer data 708. The packet header 702 may include information that indicates what type of data is included in the payload of the consolidated audio packet 700, e.g., each consolidated audio packet 700 is not required to include all of the primary audio data 704, the secondary audio data 706, and the voice accelerometer data 708.

Returning to FIG. 6, the eSCO intervals may continue in the manner described above, unless one of the audio output devices needs to transmit a source audio packet to the other audio output device that did not successfully receive the source audio packet. In such a scenario, the eSCO interval would include the source audio data packets 610, the primary bud audio packets, and the source audio packets that were not successfully received by one of the audio output devices.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a first wireless audio output device configured to perform operations comprising:
   establishing a communication link to a source device using a wireless communication protocol;
   receiving source audio data from the source device;
   receiving secondary audio data from a second wireless audio output device;
   combining primary audio data from the first wireless audio output device with the secondary audio data into a consolidated audio packet, wherein the consolidated audio packet further includes accelerometer data from a voice accelerometer of one of the first wireless audio output device or the second wireless audio output device; and
   transmitting the consolidated audio packet to the source device.

2. The processor of claim 1, wherein the accelerometer data comprises physiological data associated with a user of the first and second wireless audio output devices.

3. The processor of claim 1, wherein the secondary audio data is received from the second wireless audio output device in a peer-to-peer slot of an extended synchronous connection oriented (eSCO) data traffic interval.

4. The processor of claim 1, wherein the primary audio data comprises first microphone audio from a first microphone of the first wireless audio output device and the secondary audio data comprises second microphone audio from a second microphone of the second wireless audio output device.

5. A first wireless audio output device, comprising:
   a transceiver configured to communicate with a source device;
   a processor communicatively coupled to the transceiver and configured to perform operations comprising:
      establishing a communication link with the source device using a wireless communication protocol;
      receiving source audio data from the source device;
      receiving secondary audio data from a second wireless audio output device; combining primary audio data from the first wireless audio output device with the secondary audio data to generate a consolidated audio packet; and
      transmitting the consolidated audio packet to the source device;
   a voice accelerometer configured to collect accelerometer data, wherein the consolidated audio packet further includes the accelerometer data.

6. The first wireless audio output device of claim 5, wherein the accelerometer data comprises physiological data associated with the user.

7. The first wireless audio output device of claim 5, wherein the secondary audio data is received from the second wireless audio output device in a peer-to-peer slot of an extended synchronous connection oriented (eSCO) data traffic interval.

8. The first wireless audio output device of claim 5, further comprising:
   a microphone configured to collect the primary audio data.

9. The first wireless audio output device of claim 8, wherein the secondary audio data comprises microphone audio collected by a microphone of the second wireless audio output device.

10. A method performed by a first wireless audio output device, comprising:
    receiving, from a source device, source audio data in a first slot of a first transmission interval; and
    transmitting, to the source device, a consolidated audio packet comprising primary audio data generated by the first wireless audio output device and secondary audio data generated by a second wireless audio output device in a second slot of a second transmission interval, wherein the first transmission interval comprises an extended synchronous connection oriented (eSCO) data traffic interval.

11. The method of claim 10, further comprising:
    receiving, from the second wireless audio output device, secondary audio data in a second transmission interval prior to the first transmission interval.

12. The method of claim 11, further comprising: combining the primary audio data and the secondary audio data in the consolidated audio packet.

13. The method of claim 10, further comprising:
    receiving, from the second wireless audio output device, further secondary audio data in a third slot of the first transmission interval.

14. The method of claim 10, wherein the primary audio data comprises first microphone audio from the first wireless audio output device and the secondary audio data comprises second microphone audio from the second wireless audio output device.

15. The method of claim 10, wherein the consolidated audio packet further includes accelerometer data from a voice accelerometer of one of the first wireless audio output device or the second wireless audio output device.

16. The method of claim 15, wherein the accelerometer data comprises physiological data associated with a user of the first or second wireless audio output device.

17. The method of claim 10, further comprising:
    determining whether the first and second wireless audio output devices successfully received the source audio data of the first transmission interval; and
    when at least one of the first and second wireless audio output devices has not successfully received the source audio data, performing, during a third slot of the first transmission interval, a data exchange with the second wireless audio output device to have the one of the first and second wireless audio output devices successfully receive the source audio data.

18. The method of claim 17, further comprising:
    when both the first and second wireless audio output devices have successfully received the source audio data, receiving, during a third slot of the first transmission interval, further secondary audio data from the second wireless audio output device.

19. The method of claim 10, further comprising:
    collecting, by a microphone of the first wireless audio output device, the primary audio data, wherein the collecting comprises sampling the microphone synchronized to eSCO timing.

20. The method of claim 10, wherein the first and second wireless audio output devices comprise ear buds or wireless headphones.

\* \* \* \* \*